US012784951B2

(12) United States Patent
Iwabuchi et al.

(10) Patent No.: US 12,784,951 B2
(45) Date of Patent: Nov. 3, 2026

(54) POWDER MAGNETIC CORE AND METHOD FOR PRODUCING POWDER MAGNETIC CORE

(71) Applicant: Panasonic Intellectual Property Management Co., Ltd., Osaka (JP)

(72) Inventors: Toru Iwabuchi, Osaka (JP); Hitoshi Horiuchi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 589 days.

(21) Appl. No.: 18/552,869

(22) PCT Filed: Mar. 16, 2022

(86) PCT No.: PCT/JP2022/012021

§ 371 (c)(1),
(2) Date: Sep. 27, 2023

(87) PCT Pub. No.: WO2022/220004

PCT Pub. Date: Oct. 20, 2022

(65) Prior Publication Data

US 2024/0170191 A1 May 23, 2024

(30) Foreign Application Priority Data

Apr. 14, 2021 (JP) ................................ 2021-068712

(51) Int. Cl.
*H01F 1/26* (2006.01)
*B22F 3/00* (2021.01)
(Continued)

(52) U.S. Cl.
CPC .................. *H01F 1/26* (2013.01); *B22F 3/00* (2013.01); *H01F 27/255* (2013.01); *H01F 41/02* (2013.01)

(58) Field of Classification Search
CPC .......... H01F 1/26; H01F 27/255; H01F 41/02; B22F 3/00
See application file for complete search history.

(56) References Cited

U.S. PATENT DOCUMENTS

2002/0097124 A1* 7/2002 Inoue .................... H01F 27/027 336/83
2003/0077448 A1* 4/2003 Ueta .................. H01F 41/0246 428/404
(Continued)

FOREIGN PATENT DOCUMENTS

JP 2002-252120 A 9/2002
JP 2002-305108 A 10/2002
(Continued)

OTHER PUBLICATIONS

International Search Report issued on Jun. 14, 2022 in International Patent Application No. PCT/JP2022/012021, with English translation.

*Primary Examiner* — Malcolm Barnes
(74) *Attorney, Agent, or Firm* — Rimon P.C.

(57) ABSTRACT

A powder magnetic core includes: a metal magnetic substance powder; a binding agent that binds particles of the metal magnetic substance powder; and an insulating powder provided in the binding agent. The insulating powder includes a first insulating powder and a second insulating powder each of which is in a needle shape or a plate shape. A median diameter D50 of the second insulating powder is smaller than a median diameter D50 of the first insulating powder.

7 Claims, 11 Drawing Sheets

(51) Int. Cl.
*H01F 27/25* (2006.01)
*H01F 27/255* (2006.01)
*H01F 41/02* (2006.01)

(56) References Cited

U.S. PATENT DOCUMENTS

2004/0046626 A1* 3/2004 Nakata ...................... H01F 3/10
336/83
2011/0175013 A1* 7/2011 Takahashi ................. H01F 1/24
264/109

FOREIGN PATENT DOCUMENTS

JP 2019057654 A * 4/2019
WO 2010/038441 A1 4/2010

* cited by examiner

FIG. 4

| Sample No. | Comparative example = * | Median diameter D50 of insulating powder (μm) | Median diameter D50 of insulating powder / Median diameter D50 of metal magnetic substance powder | Added amount (wt%) | Permeability | Withstand voltage (V/mm) | Permeability × Withstand voltage |
|---|---|---|---|---|---|---|---|
| 1 | * | 10 | 1.14 | 3 | 18.18 | 255 | 4636 |
| 2 | * | 8.4 | 0.95 | 3 | 18.9 | 251 | 4744 |
| 3 | * | 7 | 0.80 | 3 | 19.5 | 245 | 4778 |
| 4 | * | 4.8 | 0.55 | 3 | 20.8 | 238 | 4950 |
| 5 | * | 2.5 | 0.28 | 3 | 21.9 | 231 | 5059 |
| 6 | * | 1.5 | 0.17 | 3 | 25.1 | 203 | 5095 |
| 7 | * | 1 | 0.11 | 3 | 26.4 | 180 | 4752 |
| 8 | * | 0.6 | 0.07 | 3 | 27.5 | 170 | 4675 |
| 9 | * | 0 | 0 | 0 | 30.3 | 148 | 4484 |

FIG. 5
Sample No. 3
(a) SEM image
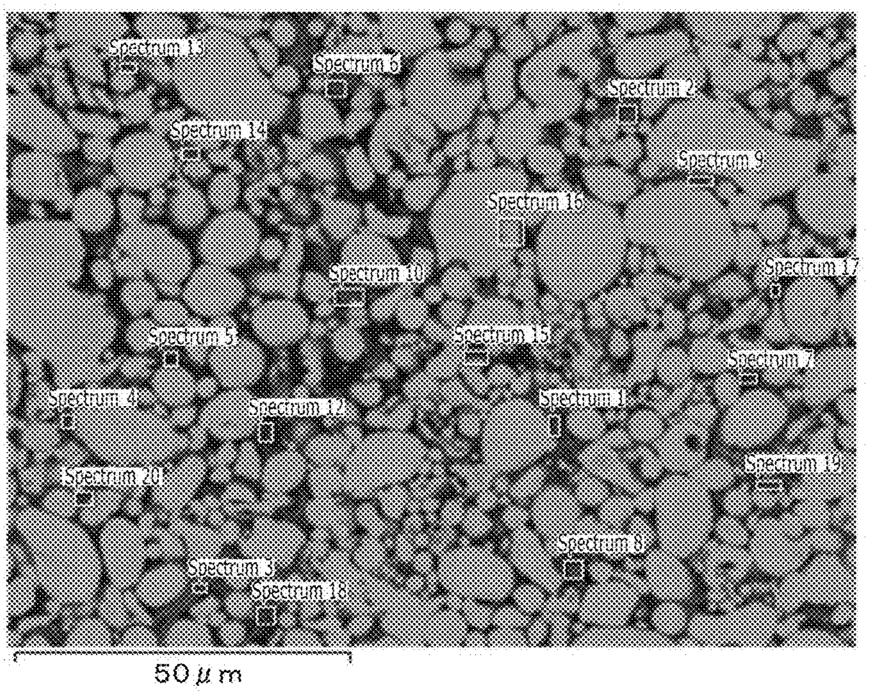
(b) BSE image
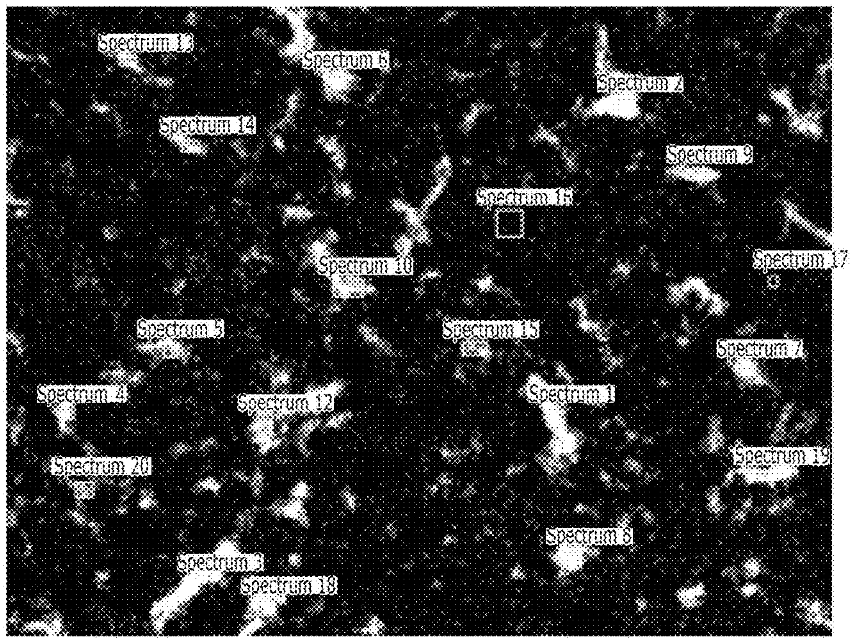

FIG. 6
Sample No. 8
(a) SEM image
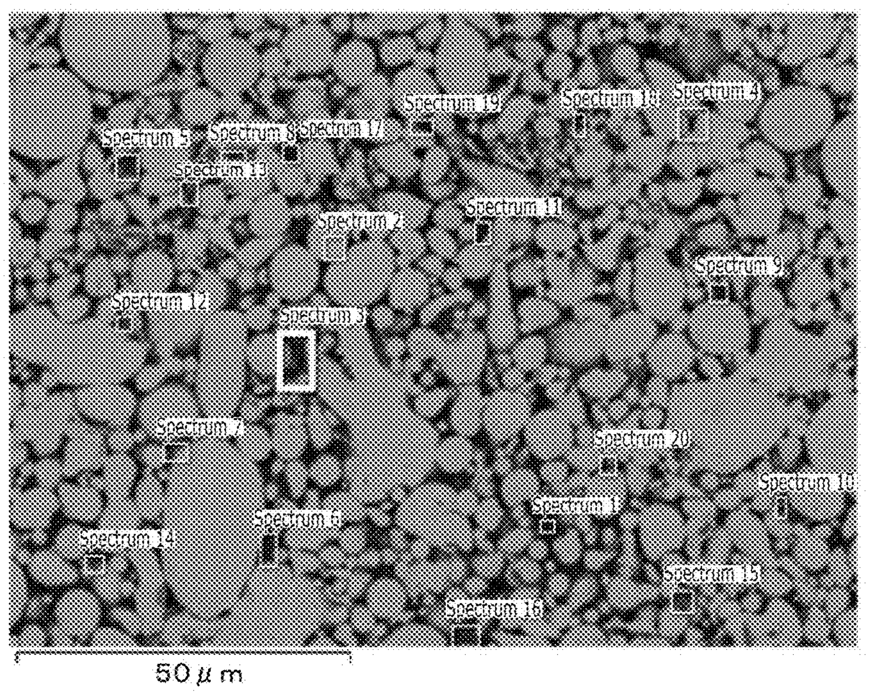
(b) BSE image
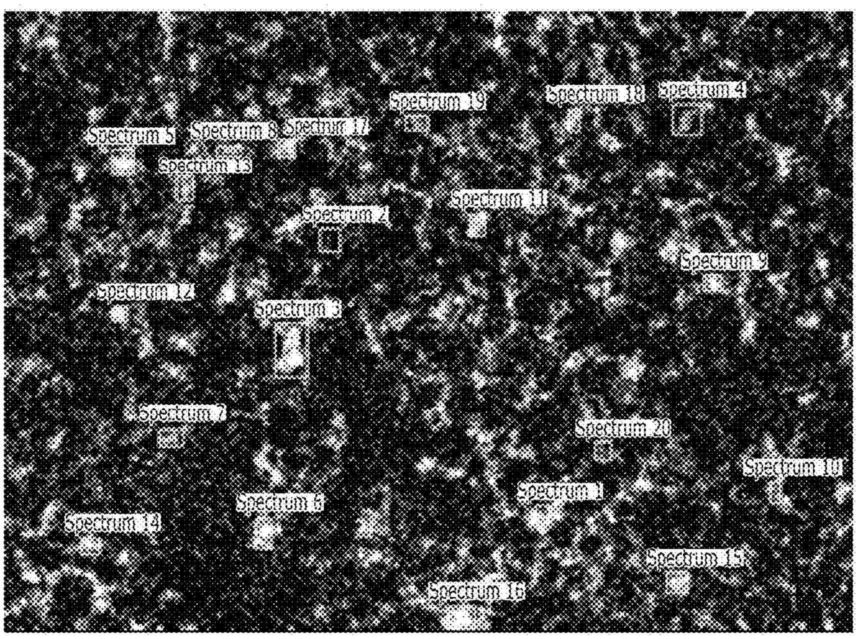

FIG. 7

| Sample No. | Comparative example = * | First insulating powder | | | Second insulating powder | | Ratio of median diameters D50 | Permeability | Withstand voltage (V/mm) | Permeability × Withstand voltage |
|---|---|---|---|---|---|---|---|---|---|---|
| | | Median diameter D50 (μm) | Median diameter D50 of first insulating powder / Median diameter D50 of metal magnetic substance powder | Added amount (wt%) | Median diameter D50 (μm) | Added amount (wt%) | Median diameter D50 of first insulating powder / Median diameter D50 of second insulating powder | | | |
| 1 | * | 10 | 1.14 | 1.5 | 10 | 1.5 | 1.00 | 18.18 | 255 | 4636 |
| 10 | * | 10 | 1.14 | 1.5 | 7 | 1.5 | 1.43 | 18.5 | 253 | 4681 |
| 11 | * | 10 | 1.14 | 1.5 | 4.8 | 1.5 | 2.08 | 20.8 | 249 | 5179 |
| 12 | * | 10 | 1.14 | 1.5 | 2.5 | 1.5 | 4.00 | 21 | 243 | 5103 |
| 13 | * | 10 | 1.14 | 1.5 | 1 | 1.5 | 10.00 | 21.7 | 238 | 5165 |
| 3 | * | 7 | 0.80 | 1.5 | 7 | 1.5 | 1.00 | 19.5 | 245 | 4778 |
| 14 | | 7 | 0.80 | 1.5 | 5 | 1.5 | 1.40 | 21.8 | 247 | 5385 |
| 15 | | 7 | 0.80 | 1.5 | 2.5 | 1.5 | 2.80 | 23 | 241 | 5543 |
| 16 | | 7 | 0.80 | 1.5 | 1.5 | 1.5 | 4.67 | 24.6 | 239 | 5872 |
| 17 | | 7 | 0.80 | 1.5 | 0.6 | 1.5 | 11.67 | 25.4 | 237 | 6020 |
| 4 | * | 4.8 | 0.55 | 1.5 | 4.8 | 1.5 | 1.00 | 20.8 | 238 | 4950 |
| 18 | | 4.8 | 0.55 | 1.5 | 3 | 1.5 | 1.60 | 23.2 | 239 | 5545 |
| 19 | | 4.8 | 0.55 | 1.5 | 1.5 | 1.5 | 3.20 | 24.6 | 232 | 5707 |
| 20 | | 4.8 | 0.55 | 1.5 | 0.6 | 1.5 | 8.00 | 25.1 | 218 | 5472 |
| 5 | * | 2.5 | 0.28 | 1.5 | 2.5 | 1.5 | 1.00 | 21.9 | 231 | 5059 |
| 21 | | 2.5 | 0.28 | 1.5 | 1.5 | 1.5 | 1.67 | 24.4 | 229 | 5588 |
| 22 | | 2.5 | 0.28 | 1.5 | 1 | 1.5 | 2.50 | 24.6 | 228 | 5609 |
| 23 | | 2.5 | 0.28 | 1.5 | 0.6 | 1.5 | 4.17 | 25.6 | 221 | 5658 |
| 7 | * | 1 | 0.11 | 1.5 | 1 | 1.5 | 1.00 | 26.4 | 180 | 4752 |
| 24 | * | 1 | 0.11 | 1.5 | 0.8 | 1.5 | 1.25 | 25.8 | 182 | 4696 |
| 25 | * | 1 | 0.11 | 1.5 | 0.6 | 1.5 | 1.67 | 26 | 180 | 4680 |

FIG. 8
Sample No. 17
(a) SEM image
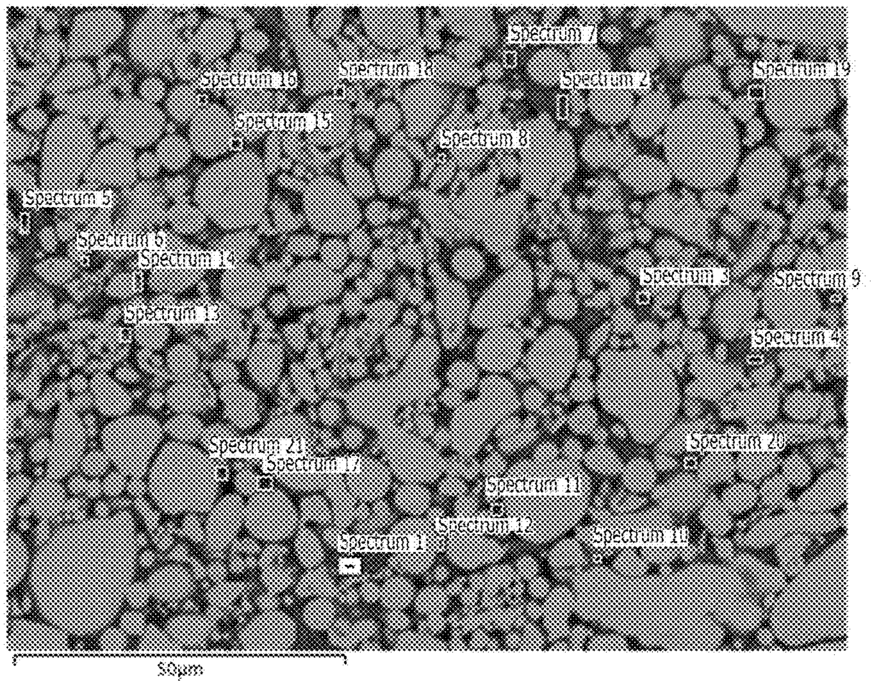
(b) BSE image
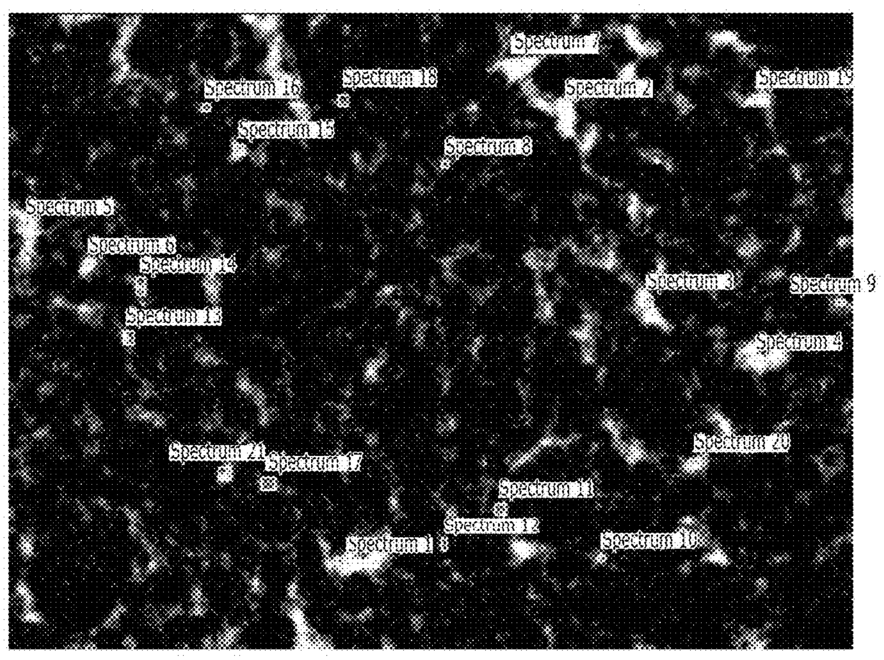

FIG. 9A

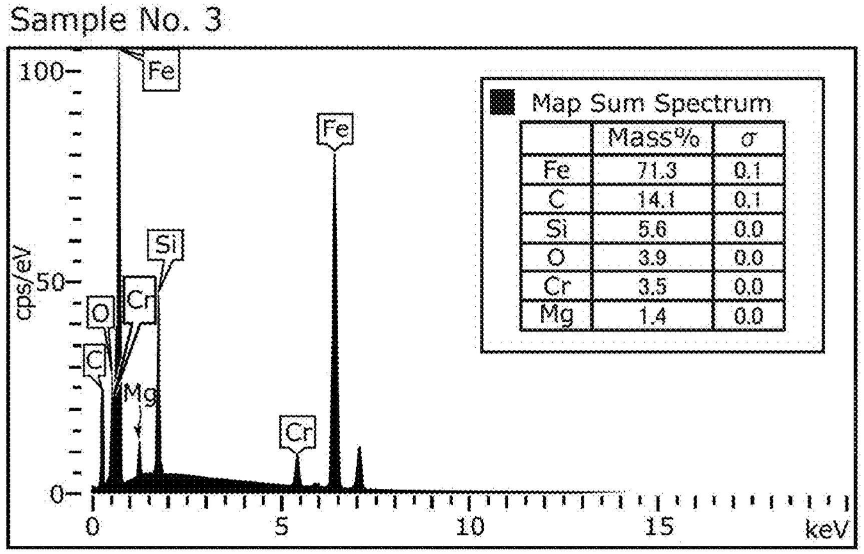

FIG. 9B

Sample No. 3

Reference detected amount
R1 = 7.1 mass%

| Measurement point (Spectrum) | Mg detected amount x (mass%) | Determination on segregation or dispersion |
|---|---|---|
| 1 | 13.7 | Segregation |
| 2 | 16.2 | Segregation |
| 3 | 15.7 | Segregation |
| 4 | 11 | Segregation |
| 5 | 7.4 | Segregation |
| 6 | 12.9 | Segregation |
| 7 | 12.3 | Segregation |
| 8 | 12.8 | Segregation |
| 9 | 14.4 | Segregation |
| 10 | 9.1 | Segregation |
| 11 | — | — |
| 12 | 7.7 | Segregation |
| 13 | 8.8 | Segregation |
| 14 | 10.6 | Segregation |
| 15 | 8.4 | Segregation |
| 16 | 0 | — |
| 17 | 0.5 | — |
| 18 | 12.1 | Segregation |
| 19 | 14.8 | Segregation |
| 20 | 5.7 | Dispersion |

FIG. 10A

Sample No. 8

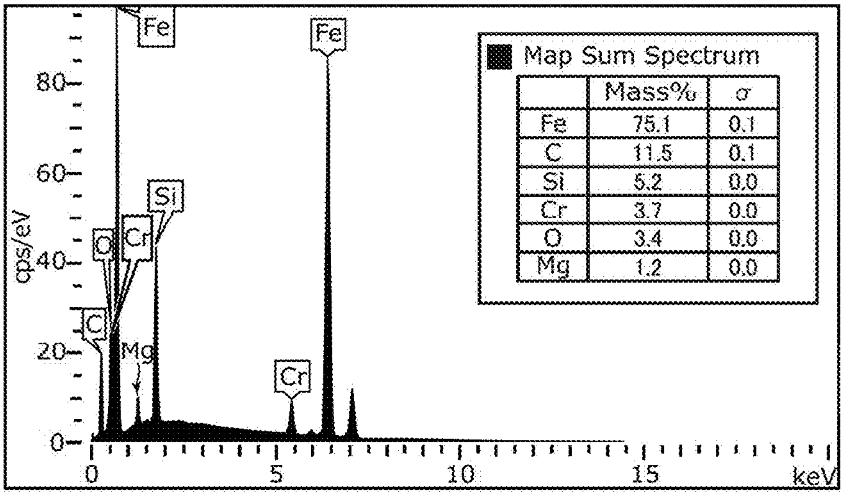

FIG. 10B

Sample No. 8

Reference detected amount R2 = 7.5 mass%

| Measurement point (Spectrum) | Mg detected amount x (mass%) | Determination on segregation or dispersion |
|---|---|---|
| 1 | 5.4 | Dispersion |
| 2 | 0.3 | — |
| 3 | 4.1 | Dispersion |
| 4 | 1.7 | Dispersion |
| 5 | 4.8 | Dispersion |
| 6 | 5.6 | Dispersion |
| 7 | 2.3 | Dispersion |
| 8 | 3.1 | Dispersion |
| 9 | 3.7 | Dispersion |
| 10 | 2.3 | Dispersion |
| 11 | 3.9 | Dispersion |
| 12 | 5.7 | Dispersion |
| 13 | 2.4 | Dispersion |
| 14 | 3.5 | Dispersion |
| 15 | 2.9 | Dispersion |
| 16 | 6.3 | Dispersion |
| 17 | 4.4 | Dispersion |
| 18 | 4.5 | Dispersion |
| 19 | 1.7 | Dispersion |
| 20 | 1.2 | Dispersion |

FIG. 11A

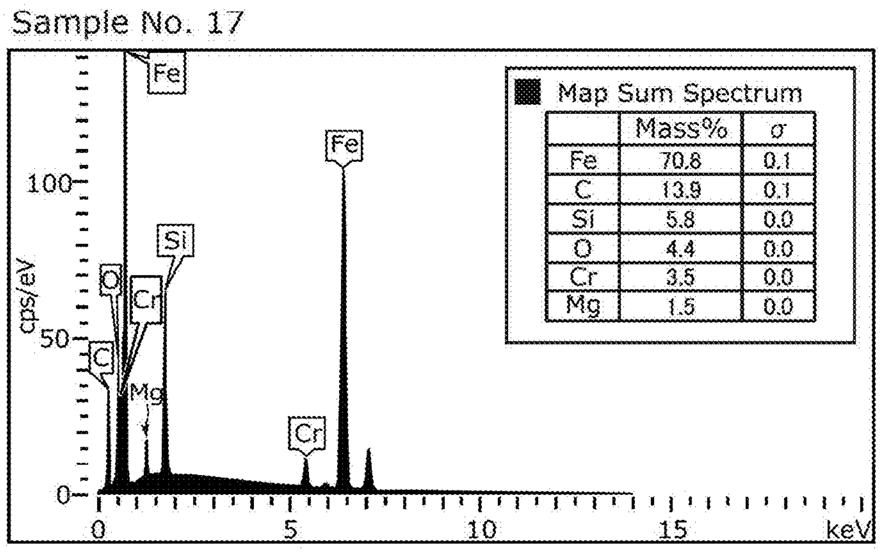

FIG. 11B

Sample No. 17

Reference detected amount R3 = 7.5 mass%

| Measurement point (Spectrum) | Mg detected amount x (mass%) | Determination on segregation or dispersion |
|---|---|---|
| 1 | 15.4 | Segregation |
| 2 | 14.5 | Segregation |
| 3 | 12.3 | Segregation |
| 4 | 14.2 | Segregation |
| 5 | 11.9 | Segregation |
| 6 | 25.0 | Segregation |
| 7 | 15.2 | Segregation |
| 8 | 5.7 | Dispersion |
| 9 | 3.7 | Dispersion |
| 10 | 2.1 | Dispersion |
| 11 | 5.0 | Dispersion |
| 12 | 0.9 | Dispersion |
| 13 | 7.0 | Dispersion |
| 14 | 4.8 | Dispersion |
| 15 | 11.4 | Segregation |
| 16 | 5.7 | Dispersion |
| 17 | 4.2 | Dispersion |
| 18 | 4.8 | Dispersion |
| 19 | 9.9 | Segregation |
| 20 | 4.7 | Dispersion |

FIG. 12

| Sample No. | Comparative example = * | First insulating powder | | Second insulating powder | | Median diameter D50 of first insulating powder / Median diameter D50 of second insulating powder | Permeability | Withstand voltage (V/mm) | Permeability × Withstand voltage |
|---|---|---|---|---|---|---|---|---|---|
| | | Median diameter D50 (μm) | Added amount (wt%) | Median diameter D50 (μm) | Added amount (wt%) | | | | |
| 3 | * | 7 | 3 | 1.5 | 0 | - | 19.5 | 245 | 4778 |
| 26 | | 7 | 2.7 | 1.5 | 0.3 | 4.67 | 22.6 | 240 | 5424 |
| 27 | | 7 | 2.1 | 1.5 | 0.9 | | 23.9 | 239 | 5712 |
| 16 | | 7 | 1.5 | 1.5 | 1.5 | | 24.6 | 239 | 5872 |
| 28 | | 7 | 1.2 | 1.5 | 1.8 | | 24.8 | 235 | 5828 |
| 29 | | 7 | 0.9 | 1.5 | 2.1 | | 25 | 220 | 5500 |
| 30 | | 7 | 0.6 | 1.5 | 2.4 | | 25.3 | 209 | 5288 |
| 6 | * | 7 | 0 | 1.5 | 3 | - | 25.7 | 197 | 5063 |
| 3 | * | 7 | 3 | 0.6 | 0 | - | 19.5 | 245 | 4778 |
| 31 | | 7 | 2.7 | 0.6 | 0.3 | 11.67 | 22.8 | 239 | 5449 |
| 32 | | 7 | 2.1 | 0.6 | 0.9 | | 24.6 | 239 | 5879 |
| 17 | | 7 | 1.5 | 0.6 | 1.5 | | 25.4 | 237 | 6020 |
| 33 | | 7 | 1.2 | 0.6 | 1.8 | | 26.1 | 232 | 6055 |
| 34 | | 7 | 0.9 | 0.6 | 2.1 | | 26.4 | 226 | 5966 |
| 35 | | 7 | 0.6 | 0.6 | 2.4 | | 26.8 | 189 | 5065 |
| 8 | * | 7 | 0 | 0.6 | 3 | - | 27.5 | 170 | 4675 |

Total of added amounts of first insulating powder and second insulating powder = 3.0 wt%

POWDER MAGNETIC CORE AND METHOD FOR PRODUCING POWDER MAGNETIC CORE

CROSS-REFERENCE OF RELATED APPLICATIONS

This application is the U.S. National Phase under 35 U.S.C. § 371 of International Patent Application No. PCT/JP2022/012021, filed on Mar. 16, 2022, which in turn claims the benefit of Japanese Patent Application No. 2021-068712, filed on Apr. 14, 2022, the entire disclosures of which applications are incorporated by reference herein.

TECHNICAL FIELD

The present disclosure relates to a powder magnetic core for use in an inductor and a method for producing the powder magnetic core.

BACKGROUND ART

In various electronic devices, a step-up/down circuit, which adjusts a power supply voltage as a drive circuit of the electronic device, a DC/DC converter circuit, and the like are used. An inductor, such as a choke coil and a transformer, is used in these circuits.

Conventionally, for inductors, there is a known inductor that, in terms of superiority of DC superposition characteristics or the like, uses a powder magnetic core that is prepared by compression molding a composite magnetic material obtained by mixing a metal magnetic substance powder and a thermosetting resin. For example, Patent Literature (PTL) 1 discloses a magnetic element in which a coil is embedded in the above-mentioned powder magnetic core (that is, the above-mentioned inductor).

CITATION LIST

Patent Literature

[PTL 1] Japanese Unexamined Patent Application Publication No. 2002-305108

SUMMARY OF INVENTION

Technical Problem

With respect to an increase in demand for a reduction in size and improvements in performance of electronic devices in recent years, the above-mentioned conventional magnetic element and the like have room for enhancing performance of a powder magnetic core. The present disclosure has been made in view of the above, and it is an object of the present disclosure to provide a powder magnetic core with higher performance.

Solution to Problem

A powder magnetic core according to an aspect of the present disclosure includes: a metal magnetic substance powder; a binding agent that binds particles of the metal magnetic substance powder; and an insulating powder provided in the binding agent, wherein the insulating powder includes a first insulating powder and a second insulating powder each of which is in a needle shape or a plate shape, and a median diameter D50 of the second insulating powder is smaller than a median diameter D50 of the first insulating powder.

Also, a method for producing a powder magnetic core according to an aspect of the present disclosure includes: mixing a metal magnetic substance powder and an insulating powder; after the mixing of the metal magnetic substance powder and the insulating powder, adding a thermosetting resin to the metal magnetic substance powder and the insulating powder and mixing together; and pressure-molding a mixture generated in the adding, wherein in the mixing of the metal magnetic substance powder and the insulating powder, the insulating powder includes a first insulating powder and a second insulating powder each of which is in a needle shape or a plate shape, and a median diameter D50 of the second insulating powder is smaller than a median diameter D50 of the first insulating powder.

Advantageous Effects of Invention

According to the present disclosure, a powder magnetic core with higher performance and the like are provided.

BRIEF DESCRIPTION OF DRAWINGS

FIG. 4 is a diagram illustrating evaluation results of powder magnetic cores of comparative examples.

FIG. 5 is a diagram illustrating an SEM image and a BSE image of a powder magnetic core for sample No. 3, which is a comparative example.

FIG. 6 is a diagram illustrating an SEM image and a BSE image of a powder magnetic core for sample No. 8, which is a comparative example.

FIG. 7 is a diagram illustrating evaluation results of powder magnetic cores of working examples and comparative examples.

FIG. 8 is a diagram illustrating an SEM image and a BSE image of a powder magnetic core for sample No. 17, which is a working example.

FIG. 9A is a diagram illustrating elemental analysis results of a powder magnetic core for sample No. 3.

FIG. 9B is a diagram illustrating a detected amount of the element Mg at each measurement point in the powder magnetic core for sample No. 3.

FIG. 10A is a diagram illustrating elemental analysis results of the powder magnetic core for sample No. 8.

FIG. 10B is a diagram illustrating a detected amount of the element Mg at each measurement point in the powder magnetic core for sample No. 8.

FIG. 11A is a diagram illustrating elemental analysis results of the powder magnetic core for sample No. 17.

FIG. 11B is a diagram illustrating a detected amount of the element Mg at each measurement point in the powder magnetic core for sample No. 17.

FIG. 12 is a diagram illustrating evaluation results of powder magnetic cores of other working examples.

Figure 1:
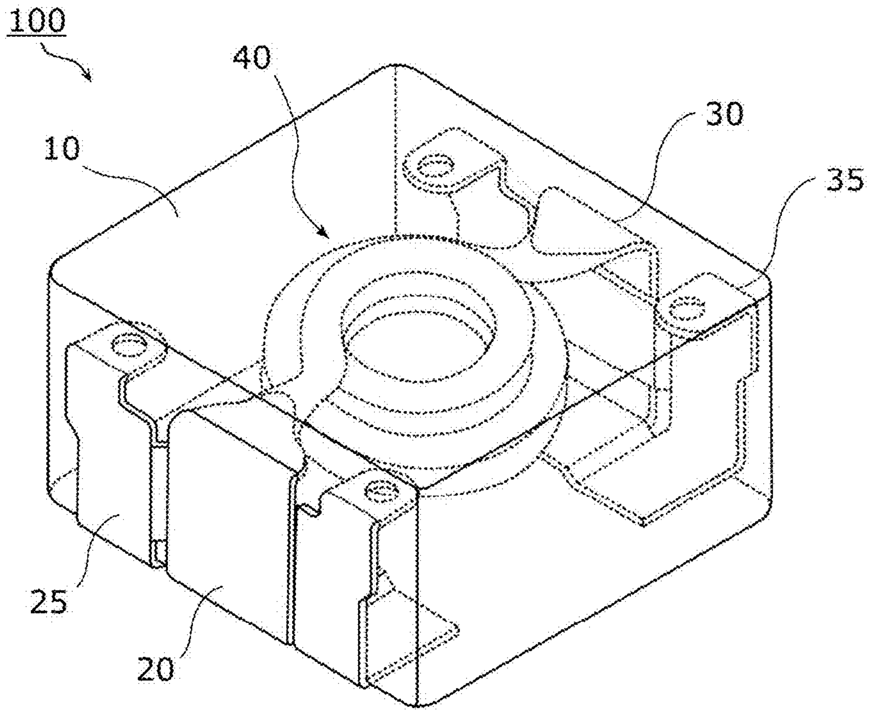
FIG. 1 is a schematic perspective view illustrating the configuration of an electrical component that includes a powder magnetic core according to an embodiment.

DESCRIPTION OF EMBODIMENTS (Knowledge Leading to the Disclosure)

A powder magnetic core is prepared such that insulating powder is added to a metal magnetic substance powder to obtain insulating properties between the particles of the metal magnetic substance powder, a resin material having a thermosetting property is added to the mixture to bind them, and pressure-molding is then performed. To increase magnetic properties of the powder magnetic core, it is important to shorten a distance between particles of the metal magnetic substance powder. That is, it is important to fill the metal magnetic substance powder at a high density.

One of the measures for the above is to reduce the added amount of the resin material and the added amount of the insulating powder. With such a measure, the amounts of the resin material and the insulating powder disposed between the particles of the metal magnetic substance powder are reduced and a filling rate of the metal magnetic substance powder is increased and hence, it is possible to obtain a powder magnetic core having high permeability.

However, when the added amount of the insulating powder is reduced, a voltage at which dielectric breakdown occurs between particles of the metal magnetic substance powder is decreased. In other words, withstand voltage performance of the powder magnetic core is decreased corresponding to a reduction in the added amount of the insulating powder. That is, although such a powder magnetic core has high permeability, withstand voltage performance is low. In contrast, an increase in the added amount of the insulating powder causes a decrease in permeability. As described above, there is a trade-off relationship between permeability and the withstand voltage of the powder magnetic core.

The insulating powder mixed in the metal magnetic substance powder according to the present disclosure includes a first insulating powder in a needle shape or a plate shape and a second insulating powder in a needle shape or a plate shape, and has a feature that median diameter D50 of the second insulating powder is smaller than median diameter D50 of the first insulating powder. Thus, a powder magnetic core is provided that can primarily achieve both permeability and the withstand voltage of the powder magnetic core irrespective of the above-mentioned trade-off relationship.

Hereinafter, embodiments will be specifically described with reference to the drawings.

Note that each of the embodiments described below illustrates one specific example of the present disclosure. The numerical values, shapes, materials, constituent elements, the arrangement and connection of the constituent elements, steps, the processing order of the steps, etc. illustrated in the embodiments below are mere examples, and are not intended to limit the present disclosure. Among the constituent elements in the embodiments below, constituent elements not recited in any one of the independent claims representing the most generic concepts will be described as optional constituent elements.

Embodiment

[Configuration]

First, an electrical component will be described with reference to FIG. 1 and FIG. 2 as a usage example of a powder magnetic core of an embodiment of the present disclosure.

FIG. 1 is a schematic perspective view illustrating the configuration of an electrical component that includes the powder magnetic core according to the embodiment. FIG. 1 shows the outline of powder magnetic core 10, which will be described later, and further shows the inside of powder magnetic core 10 in a transparent manner. For example, constituent elements, such as coil member 40, which are concealed by being embedded in powder magnetic core 10 are shown by broken lines to express that such constituent elements are seen through powder magnetic core 10.

As shown in FIG. 1, electrical component 100 includes powder magnetic core 10, coil member 40, first terminal member 25, and second terminal member 35.

Electrical component 100 is, for example, an inductor having a rectangular parallelepiped shape, and a rough profile of electrical component 100 is determined by the shape of powder magnetic core 10. Powder magnetic core 10 can be formed into any shape by pressure-molding. That is, the shape of powder magnetic core 10 at the time of pressure-molding allows the achievement of electrical component 100 having any shape.

Electrical component 100 is a passive component that stores, by coil member 40, electrical energy flowing between first terminal member 25 and second terminal member 35 as magnetic energy. In the present embodiment, although the description will be made for electrical component 100 as one of usage examples of powder magnetic core 10, powder magnetic core 10 may be simply used as a magnetic material, and the usage example is not limited to electrical component 100 of the present embodiment. Powder magnetic core 10 may be used for desired applications that can utilize characteristics of the magnetic material that has both high magnetic properties (specifically high permeability) and high strength.

Powder magnetic core 10 has a substantially quadrangular prism shape having rectangular facing surfaces, on which first terminal member 25 and second terminal member 35 are formed, four sides of the respective facing surfaces being connected by a top surface, a bottom surfaces, and two side surfaces. In the present embodiment, the bottom surface and the top surface have a rectangular shape having dimensions of 14.0 mm×12.5 mm, and a separation distance from the bottom surface to the top surface is 8.0 mm.

Figure 2:
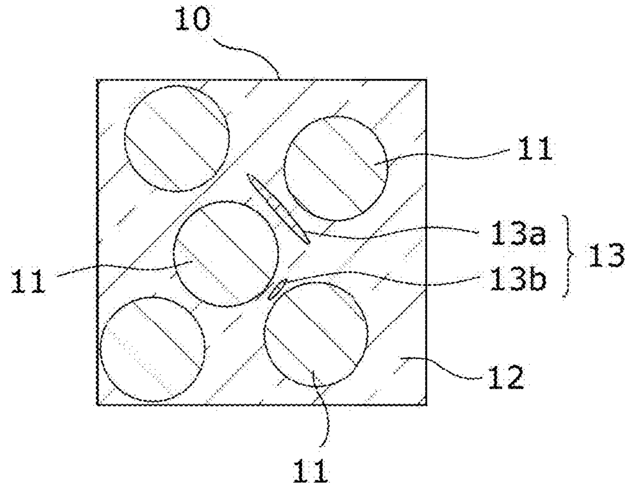
FIG. 2 is a diagram schematically illustrating a cross section of a powder magnetic core according to the embodiment.

FIG. 2 is a diagram schematically illustrating a cross section of powder magnetic core 10.

As illustrated in FIG. 2, powder magnetic core 10 includes: metal magnetic substance powder 11; binding agent 12 that binds particles of metal magnetic substance powder 11; and insulating powder 13 provided in binding agent 12.

For metal magnetic substance powder 11, Fe—Si—Al-based, Fe—Si-based, Fe—Si—Cr-based, Fe—Si—Cr—B-based, or the like metal magnetic substance powder is used. Metal magnetic substance powder 11 has a high saturation magnetic flux density compared with magnetic substance powders, such as ferrite, thus being useful for use under a high current.

In the case of using an Fe—Si—Al-based metal magnetic substance powder, for example, composition elements include Si with a content of 8% by weight or more and 12% by weight or less, Al with a content of 4% by weight or more and 6% by weight or less, and remaining composition elements including Fe and inevitable impurities. Here, examples of the inevitable impurities include Mn, Ni, P, S, C, and the like. By setting the contents of the composition elements that compose metal magnetic substance powder 11 to the above-mentioned composition ranges, high permeability and a low coercive force can be obtained.

In the case of using an Fe—Si-based metal magnetic substance powder, for example, composition elements include Si with a content of 1% by weight or more and 8% by weight or less, and remaining composition elements including Fe and inevitable impurities. Note that the inevitable impurities are the same as those described above.

In the case of using an Fe—Si—Cr-based metal magnetic substance powder, for example, composition elements include Si with a content of 1% by weight or more and 8% by weight or less, Cr with a content of 2% by weight or more and 8% by weight or less, and remaining composition elements including Fe and inevitable impurities. Note that the inevitable impurities are the same as those described above.

In the case of using an Fe—Si—Cr—B-based metal magnetic substance powder, for example, composition elements include Si with a content of 1% by weight or more and 8% by weight or less, Cr with a content of 2% by weight or more and 8% by weight or less, and remaining composition elements including Fe and inevitable impurities. Note that the inevitable impurities are the same as those described above.

A role of Si in the composition elements of the above-mentioned metal magnetic substance powder 11 is to impart an effect of reducing eddy current loss by reducing magnetic anisotropy and a magnetostriction constant and by increasing electrical resistance. By setting the content of Si in the composition elements to 1% by weight or more, it is possible to obtain an effect of improving soft magnetic properties, and by setting the content of Si in the composition elements to 8% by weight, it is possible to suppress a decrease in DC superposition characteristics by suppressing a decrease in saturation magnetization.

By causing metal magnetic substance powder 11 to contain Cr, it is possible to impart an effect of enhancing weatherability. By setting the content of Cr in the composition elements to 2% by weight or more, it is possible to obtain an effect of improving weatherability, and by setting the content of Cr in the composition elements to 8% by weight, it is possible to suppress deterioration of soft magnetic properties.

Median diameter D50 of these metal magnetic substance powders 11 is, for example, at least 5.0 μm and at most 35 μm. From the viewpoint of ensuring withstand voltage performance, median diameter D50 of metal magnetic substance powder 11 may be reduced in order to relax electric field concentration between particles, and by setting median diameter D50 as above it is possible to ensure a high filling rate. Further, by setting median diameter D50 of metal magnetic substance powder 11 to 35 μm or less, it is possible to reduce a core loss, particularly, an eddy current loss, in a high frequency region. Median diameter D50 of metal magnetic substance powder 11 is the particle diameter at which, when a count is started from a particle having a smaller particle diameter by using a particle size distribution meter that performs measurement with a laser diffraction scattering method, the integrated value reaches 50% of the whole.

Binding agent 12 is provided to cover the periphery of metal magnetic substance powder 11. A material of binding agent 12 is a thermosetting resin, and is selected from, for example, a phenol resin, a xylene resin, an epoxy resin, a polyimide resin, a silicone resin, and the like.

Insulating powder 13 is a substance that acts as an electrical insulating material. Insulating powder 13 generally has high heat resistance, and by using insulating powder 13 as the electrical insulating material, insulating properties between particles of metal magnetic substance powder 11 are ensured.

Insulating powder 13 includes first insulating powder **13*a* and second insulating powder 13*b* each of which is in a needle shape or a plate shape. A material of first insulating powder 13*a* and second insulating powder 13*b*** is an inorganic material, and is talc ($Mg_3Si_4O_{10}(OH)_2$) for both.

Each of first insulating powder **13*a* and second insulating powder 13*b* is provided in binding agent 12. Therefore, first insulating powder 13*a* and second insulating powder 13*b* are provided in such a way as to be located between particles of metal magnetic substance powder 11. All of the peripheries of first insulating powder 13*a* and second insulating powder 13*b* may be covered by binding agent 12, or portions of the peripheries may be in contact with metal magnetic substance powder 11. Note that it is not necessary for first insulating powder 13*a* or second insulating powder 13*b* to be present in every space between particles of metal magnetic substance powder 11**.

First insulating powder **13*a* and second insulating powder 13*b* have the respective different particle size distributions. Therefore, particle size distribution of insulating powder 13** has two different peaks.

In the present embodiment, median diameter D50 of second insulating powder **13*b* is smaller than median diameter D50 of first insulating powder 13*a*. In other words, median diameter D50 of first insulating powder 13*a* is greater than median diameter D50 of second insulating powder 13*b***. Median diameter D50 is the particle diameter at which, when a count is started from a particle having a smaller particle diameter by using a particle size distribution meter that performs measurement with a laser diffraction scattering method, the integrated value reaches 50% of the whole.

For example, median diameter D50 of first insulating powder **13*a* is at least 1.40 times and at most 11.67 times median diameter D50 of second insulating powder 13*b*. For example, median diameter D50 of first insulating powder 13*a* is greater than 0.11 times and less than 1.14 times median diameter D50 of metal magnetic substance powder 11. For example, median diameter D50 of first insulating powder 13*a* is at least 0.28 times and at most 0.80 times median diameter D50 of metal magnetic substance powder 11**. These relationships will be described later in detail.

In the case in which median diameter D50 is 2.5 μm or more and 7 μm or less, the aspect ratio of first insulating powder **13*a* may be 30/1 or more. With this value, it is possible to enhance flowability of the metal magnetic substance powder at the time of molding the powder magnetic core. In the case in which median diameter D50 is 0.6 μm or more and 1.5 μm or less, the aspect ratio of second insulating powder 13*b* may be 20/1 or less. With this value, it is possible to contribute to insulation between particles of metal magnetic substance powder 11**. The aspect ratio used here refers to a ratio between a long side and a short side of a needle shape or a plate shape.

Subsequently, coil member 40, first terminal member 25, and second terminal member 35 will be described with reference to FIG. 1.

In coil member 40, a conductive wire, that is a long conductor covered by an insulating film, is wound (a winding), and both ends of the conductive wire are each connected to first terminal member 25 and second terminal member 35 (lead parts 20 and 30). In the present embodiment, the description will be made assuming that a round conductive wire having a diameter of 0.65 mm in cross section is used as the conductive wire. The thickness and the shape of the conductive wire are not particularly limited, and a round conductive wire, a flat conductive wire having a rectangular shape in cross section, and the like, may be suitably selectively used provided that the conductive wire has a thickness that allows the conductive wire to be wound, and the like. The winding is embedded in the vicinity of the center of powder magnetic core 10. At lead parts 20 and 30, both ends of the conductive wire continuously extend from the winding toward the facing surfaces, and protrude to the outside of powder magnetic core 10. Here, a portion of each lead part is flattened and expanded into a flat shape, and is bent to extend along the facing surface and the bottom surface. A covering formed by the insulating film is peeled off at such a flattened and expanded portion, so that the flattened and expanded portion can form electrical connections to the outside.

First terminal member 25 and second terminal member 35 are formed from a conductor plate made of a phosphor bronze material, a copper material, or the like. Each of first terminal member 25 and second terminal member 35 is configured to have a recessed portion in the vicinity of the center on the facing surface, and is configured to be fitted in powder magnetic core 10. Lead parts 20 and 30 are disposed on the outer side of these recessed portions, so that lead parts 20 and 30 are respectively electrically connected to first terminal member 25 and second terminal member 35. Lead parts 20 and 30 are connected to first terminal member 25 and second terminal member 35 by resistance welding or the like. Further, first terminal member 25 and second terminal member 35 are bent in such a way as to be inserted into the inside of powder magnetic core 10, and first terminal member 25 and second terminal member 35 are fixed to powder magnetic core 10 in a state in which the bent portions are inserted into powder magnetic core 10.

First terminal member 25 and second terminal member 35 are bent to extend along the bottom surface of powder magnetic core 10 together with lead parts 20 and 30. With such a configuration, lead parts 20 and 30 are routed to the bottom side of electrical component 100 while being held by first terminal member 25 and second terminal member 35. That is, it is possible to directly connect lead parts 20 and 30 to a land (not shown in the drawing), such as a mounting substrate, on which electrical component 100 is mounted.

First terminal member 25 and second terminal member 35 are not essential constituent elements. Provided that lead parts 20 and 30 independently have strength to maintain shape, first terminal member 25 and second terminal member 35 need not be included.

As described above, powder magnetic core 10 of the present embodiment includes: metal magnetic substance powder 11; binding agent 12 that binds particles of metal magnetic substance powder 11; and insulating powder 13 provided in binding agent 12. Insulating powder 13 includes first insulating powder 13*a* and second insulating powder 13*b* each of which is in a needle shape or a plate shape, and median diameter D50 of second insulating powder 13*b* is smaller than median diameter D50 of first insulating powder 13*a*.

With such a configuration, it is possible to provide first insulating powder 13*a* having large median diameter D50 between particles of metal magnetic substance powder 11. Thus, in the region in which first insulating powder 13*a* is provided, the separation between particles can be increased and hence, it is possible to increase the withstand voltage of powder magnetic core 10. Further, in a region different from the region in which first insulating powder 13*a* is provided, second insulating powder 13*b* having small median diameter D50 can be provided between particles of metal magnetic substance powder 11. Therefore, in the above-mentioned different region, the separation between particles can be inhibited from increasing and can be reduced and hence, it is possible to suppress a decrease in permeability of powder magnetic core 10. Due to the above, it is possible to provide powder magnetic core 10 with high performance.

[Production Method]

Next, a method for producing the above-mentioned powder magnetic core 10 will be described with reference to FIG. 3.

Figure 3:
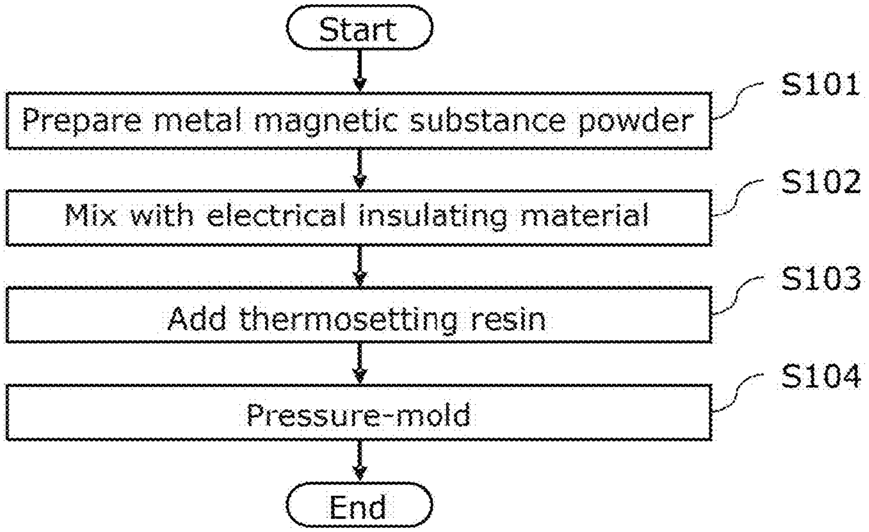
FIG. 3 is a flowchart illustrating a method for producing the powder magnetic core according to the embodiment.

FIG. 3 is a flowchart illustrating the method for producing the powder magnetic core according to the embodiment.

In producing powder magnetic core 10 of the present embodiment, first, metal magnetic substance powder 11 including predetermined composition elements is prepared (S101).

Next, metal magnetic substance powder 11 is mixed with an electrical insulating material formed from insulating powder 13 (S102: mixing). Insulating powder 13 includes two kinds of powder, that is, first insulating powder 13*a* and second insulating powder 13*b*. Median diameter D50 of second insulating powder 13*b* is smaller than median diameter D50 of first insulating powder 13*a*. The weight of first insulating powder 13*a* in insulating powder 13 is, for example, at least 0.2 times and at most 0.9 times the total weight of first insulating powder 13*a* and second insulating powder 13*b*.

In a state in which metal magnetic substance powder 11 and the electrical insulating material are substantially uniformly dispersed due to the above-mentioned mixing, a thermosetting resin, that is binding agent 12, is added, and mixing is further performed (S103: adding).

In S103, a silicone resin, that is a thermosetting resin, is added to the mixture of metal magnetic substance powder 11 and the electrical insulating material in a state of being dissolved in advance in solvent, such as IPA (Isopropyl Alcohol), and mixing (kneading) is performed. The kneading of the thermosetting resin is performed by mixing an uncured resin material with a mortar, a mixer, a ball mill, a V type mixer, a cross rotary, or the like.

The mixture mixed as described above is heated at a temperature of 65° C. or more and 150° C. or less to evaporate the solvent, and is pulverized to obtain a composite magnetic material having favorable moldability. Further, when this composite magnetic material is classified to obtain mixed powder having a particle size within a predetermined range, moldability can be further enhanced.

The mixed powder obtained as described above is charged into a mold and is pressure-molded into a desired shape to obtain powder magnetic core 10 (S104: pressure-molding). In S104, pressure-molding is performed within a range of a pressurizing force of 3 to 7 ton/cm$^2$.

Powder magnetic core 10 is prepared through these steps S101 to S104. Prepared powder magnetic core 10 is used as a part of electrical component 100 in which a coil is embedded.

Comparative Examples and Working Examples

Working Examples and comparative examples of the powder magnetic core based on the above-mentioned embodiment will be described.

In the comparative examples and the working examples, Fe—Si—Cr-based metal magnetic substance powder was used as the metal magnetic substance powder. Median diameter D50 of the metal magnetic substance powder was set to 8.8 μm. A silicone resin, that is a thermosetting resin, was used as the binding agent. The added amount of the silicone resin was set to 3.0 parts by weight per 100 parts by weight of the metal magnetic substance powder. Talc was used as a material of the first insulating powder and the second insulating powder in the insulating powder. By using these materials, a mixture of the metal magnetic substance powder, the thermosetting resin, and the insulating powder was prepared.

The prepared mixture was pressure-molded at room temperature at a pressurizing force of 4 ton/cm$^2$ to prepare a ring core having an outer diameter of 14.0 mm, an inner diameter of 10.0 mm, and a thickness of 2.00 mm for evaluating permeability. Further, the thermosetting resin was cured by performing drying for two hours under a temperature condition of 150° C. to prepare a powder magnetic core.

The prepared mixture was pressure-molded at room temperature at a pressurizing force of 4 ton/cm$^2$ to prepare a plate-shaped molded body having a length of 10 mm, a width of 10 mm, and a thickness of 0.5 mm for evaluating withstand voltage. Further, the thermosetting resin was cured by performing drying for two hours under a temperature condition of 150° C. to prepare a powder magnetic core.

[Method for Calculating Permeability]

Permeability was obtained such that inductance L at OA of an electrical component that is prepared by using each powder magnetic core was measured by using an LCR meter, and permeability was calculated by the following Equation 1 as initial permeability μi (measurement frequency 100 kHz).

$$\mu i=(L\times le)/(\mu 0\times Ae\times n^2) \quad (1)$$

Note that le is effective magnetic path length, μ0 is permeability of a vacuum, Ae is cross-sectional area, and n is the number of turns of a measuring coil.

[Method for Evaluating Withstand Voltage]

In measuring the withstand voltage value, the prepared molded body was sandwiched between conductive rubbers disposed on both main surfaces, a DC voltage having an initial value of 10 V was applied and, thereafter, an applied voltage value was continuously raised at a rate of 5 V/min, and a value (V/mm) obtained by dividing the applied voltage value immediately before occurrence of dielectric breakdown by the thickness of the molded body was used as the withstand voltage value of each powder magnetic core.

[Evaluation Index]

For the evaluation index of the powder magnetic core, the value expressed by "permeability×withstand voltage" was used. A larger value indicates that both permeability and the withstand voltage of the powder magnetic core are achieved primarily.

[Evaluation Result of Permeability and Withstand Voltage]

First, powder magnetic cores of the comparative examples will be described with reference to FIG. 4 to FIG. 6.

In each powder magnetic core of the comparative example, the insulating powder is formed from one kind of insulating powder. In the comparative examples, the added amount of a silicone resin was set to 3.0 parts by weight per 100 parts by weight of the metal magnetic substance powder.

FIG. 4 is a diagram illustrating evaluation results of the powder magnetic cores of the comparative examples. FIG. 4 shows sample No. (sample number) of powder magnetic core, median diameter D50 of insulating powder, ratio between median diameter D50 of insulating powder and median diameter D50 of the metal magnetic substance powder, added amount of insulating powder, permeability, withstand voltage, and "permeability×withstand voltage".

As shown in FIG. 4, in the powder magnetic core of the comparative example, smaller median diameter D50 of the insulating powder causes higher permeability and lower withstand voltage. In other words, larger median diameter D50 of the insulating powder causes lower permeability and higher withstand voltage.

FIG. 5 is a diagram illustrating an SEM (Scanning Electron Microscope) image and a BSE (BackScattered Electron) image of the powder magnetic core for sample No. 3, which is the comparative example. In FIG. 5, 20 measurement points, which will be described later, are also shown.

The SEM image is shown in (a) in FIG. 5, and the BSE image on the same cross section as (a) is shown in (b) in FIG. 5. White regions in the BSE image in (b) in FIG. 5 are regions in which talc, that is the insulating powder, is present. Black regions in the BSE image are regions in which the metal magnetic substance powder and the thermosetting resin, that is the binding agent, are present. The white regions in the BSE image are shown in yellow in an actual image.

As shown in FIG. 5, in sample No. 3, white regions in the BSE image are locally concentrated, thus having a large size. It is thought that the reason for this is that insulating powder having large median diameter D50 is present between particles of the metal magnetic substance powder, thus increasing the separation between particles of the metal magnetic substance powder. Therefore, in sample No. 3, a withstand voltage is 245 V/mm, which is a high value, but permeability is 19.5, which is a low value.

FIG. 6 is a diagram illustrating an SEM image and a BSE image of the powder magnetic core for sample No. 8, which is the comparative example. In FIG. 6, 20 measurement points, which will be described later, are also shown.

The SEM image is shown in (a) in FIG. 6, and the BSE image on the same cross section as (a) is shown in (b) in FIG. 6. As shown in (b) in FIG. 6, in sample No. 8, white regions are dispersed throughout the BSE image and the white regions have a small size. It is thought that the reason for this is that insulating powder having small median diameter D50 is present between particles of the metal magnetic substance powder, thus reducing the separation between particles of the metal magnetic substance powder. Therefore, in sample No. 8, permeability is 27.5, which is a high value, but a withstand voltage is 170 V/mm, which is a low value.

As described above, there is a trade-off relationship between permeability and withstand voltage in the comparative examples. In contrast, the above-mentioned trade-off relationship is improved in the working examples shown below compared with the comparative examples.

Powder magnetic cores 10 of the working examples will be described with reference to FIG. 7 and FIG. 8.

In powder magnetic core 10 of the working example, insulating powder 13 is formed from two kinds of insulating powder. In the working examples, the added amount of a silicone resin was set to 3.0 parts by weight per 100 parts by weight of the metal magnetic substance powder.

FIG. 7 is a diagram illustrating evaluation results of the powder magnetic cores of the working examples and the comparative examples. FIG. 7 shows sample No. (sample number) of powder magnetic core, median diameter D50 and the like of first insulating powder, median diameter D50 and the like of second insulating powder, ratio between median diameter D50 of first insulating powder and median diameter D50 of second insulating powder, permeability, withstand voltage, and "permeability×withstand voltage". In this diagram, sample Nos. are arranged in order of size of median diameter D50 of the first insulating powder.

Powder magnetic cores 10 of the working examples are sample Nos. 14 to 23, and the powder magnetic cores of the comparative examples are sample Nos. 1, 3 to 5, 7, 10 to 13, 24, and 25. In sample Nos. 1, 3 to 5, and 7, which are the comparative examples, one kind of insulating powder is used and hence, the same value was used for median diameter D50 of the first insulating powder and median diameter D50 of the second insulating powder.

Hereinafter, the description will be made by comparing "permeability×withstand voltage (=5095)" of sample No. 6, which is the comparative example, with "permeability× withstand voltage" in the working example.

Focusing on median diameter D50 of the first insulating powder and median diameter D50 of the second insulating powder in FIG. 7, in sample Nos. 14 to 23, which are the working examples, median diameter D50 of second insulating powder 13*b* is smaller than median diameter D50 of first insulating powder 13*a*. Further, in sample Nos. 14 to 23, median diameter D50 of first insulating powder 13*a* is at least 1.40 times and at most 11.67 times median diameter D50 of second insulating powder 13*b*, and the value of "permeability×withstand voltage" is greater than that of sample No. 6, which is the comparative example. Accordingly, to increase the value of "permeability×withstand voltage", median diameter D50 of first insulating powder 13*a* may be set to at least 1.40 times and at most 11.67 times median diameter D50 of second insulating powder 13*b*.

Further, focusing on median diameter D50 of first insulating powder 13*a* and median diameter D50 of metal magnetic substance powder 11, in sample Nos. 14 to 23, median diameter D50 of first insulating powder 13*a* is at least 0.28 times and at most 0.80 times median diameter D50 of metal magnetic substance powder 11, and the value of "permeability×withstand voltage" is greater than that of sample No. 6, which is the comparative example. In contrast, in sample No. 10, which is the comparative example, median diameter D50 of the first insulating powder is excessively larger than median diameter D50 of the metal magnetic substance powder and hence, the value of "permeability×withstand voltage" is smaller than that of sample No. 6. In sample Nos. 24 and 25, which are the comparative examples, median diameter D50 of the first insulating powder is excessively smaller than median diameter D50 of the metal magnetic substance powder and hence, the value of "permeability×withstand voltage" is smaller than that of sample No. 6. From these results, it is thought that when median diameter D50 of first insulating powder 13*a* is greater than 0.11 times and less than 1.14 times median diameter D50 of metal magnetic substance powder 11, a preferable result can be obtained for "permeability×withstand voltage".

In the working examples, as shown in sample Nos. 15 to 17, 19, 20, 22, and 23, when median diameter D50 of first insulating powder 13*a* is 2.5 μm or more and 7.0 μm or less and when median diameter D50 of first insulating powder 13*a* is at least 2.5 times median diameter D50 of second insulating powder 13*b*, a large value is obtained for "permeability×withstand voltage". Accordingly, to further increase the value of "permeability×withstand voltage", median diameter D50 of first insulating powder 13*a* may be set to 2.5 μm or more and 7.0 μm or less, and median diameter D50 of first insulating powder 13*a* may be set to at least 2.5 times median diameter D50 of second insulating powder 13*b*.

FIG. 8 is a diagram illustrating an SEM image and a BSE image of powder magnetic core 10 for sample No. 17, which is the working example. In FIG. 8, 20 measurement points, which will be described later, are also shown.

The SEM image is shown in (a) in FIG. 8, and the BSE image on the same cross section as (a) is shown in (b) in FIG. 8. As shown in (b) in FIG. 8, in sample No. 17, the BSE image includes both portions at which white regions have a large size and portions at which white regions have a small size. It is thought that the reason for this is that, in powder magnetic core 10, both regions in which first insulating powder 13*a* having large median diameter D50 is provided and regions in which second insulating powder 13*b* having small median diameter D50 is provided are present. From the above, it is thought that sample No. 17 has both a state in which the separation between particles of the metal magnetic substance powder is large and a state in which the separation between particles of the metal magnetic substance powder is small and hence, both permeability and withstand voltage of powder magnetic core 10 are primarily achieved.

To confirm such a point, a dispersion state of the insulating powder in the powder magnetic core will be described below.

[Dispersion State of Insulating Powder in Powder Magnetic Core]

The dispersion state of the insulating powder in the powder magnetic core will be described with reference to FIG. 5, FIG. 6, FIG. 8, and FIG. 9A to FIG. 11B.

In this example, to determine the dispersion state of the insulating powder, the detected amount of an element Mg between particles of the metal magnetic substance powder is examined. The reason for focusing on the element Mg is that the element Mg is included in neither the metal magnetic substance powder nor the binding agent, but is included in only the insulating powder. In view of the above, elemental analysis of the powder magnetic core is performed based on the image of the cross section of the powder magnetic core and the detected amount of the element Mg between particles of the metal magnetic substance powder is examined to determine the dispersion state of the insulating powder.

First, sample No. 3, which is the comparative example, will be described. Here, a determination method for determining the dispersion state of the insulating powder is also described simultaneously.

As described above, FIG. 5 is a diagram illustrating the SEM image and the BSE image of the powder magnetic core for sample No. 3, which is the comparative example. In each of the SEM image and the BSE image in FIG. 5, the 20 measurement points, that are target regions in which elemental analysis is performed, are drawn.

First, regions in which the insulating powder, that is talc, is present between particles of the metal magnetic substance powder (white regions in the BSE image) are identified from the SEM image and the BSE image, and the 20 measurement points at which the element Mg is predicted to be detected are selected. FIG. 5 shows the 20 measurement points including spectrum 1 to spectrum 20.

The number of measurement points is not limited to twenty, and may be the number sufficient for determining the dispersion state of the insulating powder. The detected amount of the element Mg at each measurement point is obtained by excluding the metal magnetic substance powder and the like from the detected data and hence, a black region may be included in the measurement point. The detected amounts of a plurality of elements at the measurement point are expressed as the ratio in performing elemental analysis and hence, the respective measurement points may have different areas.

Before the detected amount of the element Mg at each measurement point is obtained, elemental analysis of the entirety of the BSE image is performed to decide a reference detected amount of the element Mg. The reference detected amount of the element Mg is a detection rate of the element Mg in a remaining region obtained by excluding the metal magnetic substance powder from the entirety of the BSE image, and is used to determine segregation or dispersion of the element Mg at each of the 20 measurement points.

FIG. 9A is a diagram illustrating elemental analysis results of the powder magnetic core for sample No. 3. FIG. 9A shows the detected amounts of respective elements included in the powder magnetic core for sample No. 3, that is, shows that the detected amount of an element Fe is 71.3% by mass, the detected amount of an element C is 14.1% by mass, the detected amount of an element Si is 5.6% by mass, the detected amount of an element O is 3.9% by mass, the detected amount of an element Cr is 3.5% by mass, and the detected amount of the element Mg is 1.4% by mass. These analysis results can be obtained by using an energy dispersion type X-ray analyzer, for example.

The reference detected amount of the element Mg between particles of the metal magnetic substance powder is calculated based on the above-mentioned elemental analysis results. For example, when elements included in the metal magnetic substance powder are excluded from the plurality of elements included in the powder magnetic core, elements included in a thermosetting resin and elements included in the insulating powder are left. Accordingly, by taking the detected amount of the element Mg from the elemental analysis results in FIG. 9A as the numerator and by taking the total of the detected amounts of the plurality of elements included in the thermosetting resin and the insulating powder as the denominator, it is possible to calculate the reference detected amount of the element Mg, which is the determination criterion.

Specifically, when "y" denotes the detected amount (mass %) of the element Mg in the entirety of the BSE image and "z" denotes the detected amount (mass %) of the metal magnetic substance powder in the entirety of the BSE image, reference detected amount R of the element Mg is obtained by the following Equation 1.

$$R=(y/(100-z))\times 100 \qquad \text{(Equation 1)}$$

By comparing reference detected amount R obtained as described above with the detected amount of the element Mg at each measurement point, it is determined whether the element Mg is segregated or dispersed at each measurement point. Specifically, when "x" denotes the detected amount of the element Mg at a predetermined measurement point, and when detected amount x is larger than reference detected amount R, it is determined that the element Mg is segregated at the predetermined measurement point, and when detected amount x is smaller than reference detected amount R, it is determined that the element Mg is dispersed at the predetermined measurement point.

Further, the plurality of measurement points is viewed in total to determine whether the insulating powder is moderately dispersed in the image without being excessively concentrated nor being excessively dispersed. In this example, of the 20 measurement points, when there are five or more measurement points at which the element Mg is segregated and there are five or more measurement points at which the element Mg is dispersed, it is determined that the insulating powder is moderately dispersed.

That is, of the 20 measurement points, when five or more measurement points satisfy $x>R$ and five or more measurement points satisfy $x<R$, it is determined that the insulating powder is moderately dispersed in the image. In contrast, of the 20 measurement points, when five or more measurement points satisfy $x>R$ but five or more measurement points do not satisfy $x<R$, it is determined that the insulating powder is excessively concentrated locally in the image. Further, of the 20 measurement points, when five or more measurement points satisfy $x<R$ but five or more measurement points do not satisfy $x>R$, it is determined that the insulating powder is excessively dispersed in the image.

By using the above-mentioned determination method, the dispersion state of the insulating powder in the powder magnetic core for sample No. 3, which is the comparative example, is determined.

In the case of sample No. 3, which is the comparative example, detected amount y of the element Mg in the entirety of the BSE image is $y=1.4$. Further, detected amount z of the metal magnetic substance powder in the entirety of the BSE image is obtained by z=(mass % of element Fe+mass % of element Si+mass % of element Cr), and is $z=(71.3+5.6+3.5)$. Although there are only trace amounts, an element Si of silicone resin and an element Si of the insulating powder are also included in detected amount z.

When reference detected amount R1 of the element Mg is calculated based on the above-mentioned Equation 1, detected amount y, and detected amount z, reference detected amount R1 is a value shown below.

$$R1=(1.4/(100-71.3-5.6-3.5))\times 100=7.1$$

In the powder magnetic core for sample No. 3, by comparing above-mentioned reference detected amount R1 with detected amount x of the element Mg at each measurement point, it is determined whether the element Mg is segregated or dispersed at each measurement point.

FIG. 9B is a diagram illustrating the detected amount of the element Mg at each measurement point in the powder magnetic core for sample No. 3. In FIG. 9B, detected amounts x of the element Mg corresponding to respective 20 measurement points are shown as mass %. To confirm that the detected amount of the element Mg is 0% by mass at portions including no white regions, spectrums 11, 16, and 17 are included in the measurement points.

As shown in FIG. 9B, at spectrum 1, the detected amount of the element Mg is 13.7, thus being larger than reference detected amount R1=7.1 and hence, it is determined that the element Mg is segregated at the measurement point of spectrum 1. Whether the element Mg is segregated or dispersed is determined also for measurement points of other spectrums in the same manner.

In sample No. 3, of the 20 measurement points, detected amount x of the element Mg is greater than reference detected amount R1 at 16 measurement points, so it is determined that the element Mg is segregated. Further, of the 20 measurement points, detected amount x of the element Mg is smaller than reference detected amount R1 at 1 measurement point, so it is determined that the element Mg is dispersed. Accordingly, from the overall viewpoint, it is determined that the insulating powder is excessively concentrated locally in the powder magnetic core for sample No. 3, and that the insulating powder is not in a moderate dispersion state.

As described above, in the powder magnetic core for sample No. 3, the insulating powder is excessively concentrated locally and hence, it is thought that, as shown in FIG. 4, a withstand voltage is 245 V/mm, which is a high value, but permeability is 19.5, which is a low value.

Next, sample No. 8, which is the comparative example, will be described.

As described above, FIG. 6 is a diagram illustrating the SEM image and the BSE image of the powder magnetic core for sample No. 3, which is the comparative example. In each of the SEM image and the BSE image in FIG. 6, the 20 measurement points, that are target regions in which elemental analysis is performed, are drawn.

First, regions in which the insulating powder, that is talc, is present between particles of the metal magnetic substance powder (white regions in the BSE image) are identified from the SEM image and the BSE image, and the 20 measurement points at which the element Mg is predicted to be detected are selected. FIG. 6 shows the 20 measurement points including spectrum 1 to spectrum 20.

Before the detected amount of the element Mg at each measurement point is obtained, elemental analysis of the entirety of the BSE image is performed to decide a reference detected amount of the element Mg.

FIG. 10A is a diagram illustrating elemental analysis results of the powder magnetic core for sample No. 8. FIG. 10A shows the detected amounts of respective elements included in the powder magnetic core for sample No. 8, that is, shows that the detected amount of an element Fe is 75.1% by mass, the detected amount of an element C is 11.5% by mass, the detected amount of an element Si is 5.2% by mass, the detected amount of an element Cr is 3.7% by mass, the detected amount of an element O is 3.4% by mass, and the detected amount of an element Mg is 1.2% by mass.

In the case of sample No. 8, which is the comparative example, detected amount y of the element Mg in the entirety of the BSE image is y=1.2. Further, detected amount z of the metal magnetic substance powder in the entirety of the BSE image is obtained by z=(mass % of element Fe+mass % of element Si+mass % of element Cr), and is z=(75.1+5.2+3.7). Although there are only trace amounts, an element Si of silicone resin and an element Si of the insulating powder are also included in detected amount z.

When reference detected amount R2 of the element Mg is calculated based on the above-mentioned Equation 1, detected amount y, and detected amount z, reference detected amount R2 is a value shown below.

$$R2=(1.2/(100-75.1-5.2-3.7))\times 100=7.5$$

In the powder magnetic core for sample No. 8, by comparing above-mentioned reference detected amount R2 with detected amount x of the element Mg at each measurement point, it is determined whether the element Mg is segregated or dispersed at each measurement point.

FIG. 10B is a diagram illustrating the detected amount of the element Mg at each measurement point in the powder magnetic core for sample No. 8. In FIG. 10B, detected amounts x of the element Mg corresponding to respective 20 measurement points are shown as mass %. To confirm that the detected amount of the element Mg is less at portions where there are less white regions, spectrum 2 is included in the measurement points.

As shown in FIG. 10B, at spectrum 1, the detected amount of the element Mg is 5.4, thus being smaller than reference detected amount R2=7.5 and hence, it is determined that the element Mg is dispersed at the measurement point of spectrum 1. Whether the element Mg is segregated or dispersed is determined also for measurement points of other spectrums in the same manner.

In sample No. 8, detected amount x of the element Mg is greater than reference detected amount R2 at none of the 20 measurement points, so it is determined that there is no measurement point where the element Mg is segregated. Further, of the 20 measurement points, detected amount x of the element Mg is smaller than reference detected amount R2 at 19 measurement point, so it is determined that the element Mg is dispersed. Accordingly, from the overall viewpoint, it is determined that the insulating powder is excessively dispersed in the powder magnetic core for sample No. 8, and that the insulating powder is not in a moderate dispersion state.

In the powder magnetic core for sample No. 8, the insulating powder is excessively dispersed and hence, it is thought that, as shown in FIG. 4, permeability is 27.5, which is a high value, but the withstand voltage is 170 V/mm, which is a low value.

Next, sample No. 17, which is a working example, will be described.

FIG. 8 is a diagram illustrating the SEM image and the BSE image of powder magnetic core 10 for sample No. 17, which is the working example. In each of the SEM image and the BSE image in FIG. 8, the 20 measurement points, that are target regions in which elemental analysis is performed, are drawn.

First, regions in which insulating powder 13, that is talc, is present between particles of metal magnetic substance powder 11 (white regions in the BSE image) are identified from the SEM image and the BSE image, and the 20 measurement points at which the element Mg is predicted to be detected are selected. FIG. 8 shows the 20 measurement points including spectrum 1 to spectrum 20.

Before the detected amount of the element Mg at each measurement point is obtained, elemental analysis of the entirety of the BSE image is performed to decide a reference detected amount of the element Mg.

FIG. 11A is a diagram illustrating elemental analysis results of powder magnetic core 10 for sample No. 17. FIG. 11A shows the detected amounts of respective elements included in powder magnetic core 10 for sample No. 17, that is, shows that the detected amount of an element Fe is 70.8% by mass, the detected amount of an element C is 13.9% by mass, the detected amount of an element Si is 5.8% by mass, the detected amount of an element O is 4.4% by mass, the detected amount of an element Cr is 3.5% by mass, and the detected amount of the element Mg is 1.5% by mass.

In the case of sample No. 17, which is the working example, detected amount y of the element Mg in the entirety of the BSE image is y=1.5. Further, detected amount z of metal magnetic substance powder 11 in the entirety of the BSE image is obtained by z=(mass % of element Fe+mass % of element Si+mass % of element Cr), and is z=(70.8+5.8+3.5). Although there are only trace amounts, an element Si of silicone resin (binding agent 12) and an element Si of insulating powder 13 are also included in detected amount z.

When reference detected amount R3 of the element Mg is calculated based on the above-mentioned Equation 1, detected amount y, and detected amount z, reference detected amount R3 is a value shown below.

$$R3=(1.5/(100-70.8-5.8-3.5))\times 100=7.5$$

In powder magnetic core 10 for sample No. 17, by comparing above-mentioned reference detected amount R3 with detected amount x of the element Mg at each measurement point, it is determined whether the element Mg is segregated or dispersed at each measurement point.

FIG. 11B is a diagram illustrating the detected amount of the element Mg at each measurement point in powder magnetic core 10 for sample No. 17. In FIG. 11B, detected amounts x of the element Mg corresponding to respective 20 measurement points are shown as mass %.

As shown in FIG. 11B, at spectrum 1, the detected amount of the element Mg is 15.4, thus being larger than reference detected amount R3=7.5 and hence, it is determined that the element Mg is segregated at the measurement point of spectrum 1. At spectrum 8, the detected amount of the element Mg is 5.7, thus being smaller than reference detected amount R3=7.5 and hence, it is determined that the element Mg is dispersed at the measurement point of spectrum 8. Whether the element Mg is segregated or dispersed is determined also for measurement points of other spectrums in the same manner.

In sample No. 17, of the 20 measurement points, detected amount x of the element Mg is greater than reference detected amount R3 at 9 measurement points, so it is determined that the element Mg is segregated. Further, of the 20 measurement points, detected amount x of the element Mg is smaller than reference detected amount R3 at 11 measurement points, so it is determined that the element Mg is dispersed. Accordingly, from the overall viewpoint, it is determined that insulating powder 13 is not excessively concentrated or excessively dispersed in powder magnetic core 10 for sample No. 17, and that insulating powder 13 is in a moderate dispersion state. In powder magnetic core 10 for sample No. 17, insulating powder 13 is in a moderate dispersion state, and hence, it is thought that, as shown in FIG. 7, permeability is 25.4, which is a high value, and a withstand voltage is 237 V/mm, which is a high value. Therefore, it is thought that the value of "permeability× withstand voltage" also becomes high.

Other Working Examples

Other working examples will be described with reference to FIG. 12. In this example, the description will be made for the case in which the added amount of first insulating powder 13*a* and the added amount of second insulating powder 13*b* are changed.

FIG. 12 is a diagram illustrating evaluation results of powder magnetic cores of other working examples. FIG. 12 shows sample No. (sample number) of powder magnetic core, median diameter D50 and added amount of first insulating powder, median diameter D50 and added amount of second insulating powder, ratio between median diameter D50 of first insulating powder and median diameter D50 of second insulating powder, permeability, withstand voltage, and "permeability×withstand voltage". In this diagram, sample Nos. are arranged in order of the added amount of the first insulating powder and in order of the ratio of median diameter D50.

In FIG. 12, powder magnetic cores 10 of other working examples are sample Nos. 16, 17, and 26 to 35, and powder magnetic cores of the comparative examples are sample Nos. 3, 6, and 8. This diagram shows advantageous effects obtained when the total of the added amount of first insulating powder 13*a* and the added amount of second insulating powder 13*b* is set at a fixed value, but the added amount of first insulating powder 13*a* and the added amount of second insulating powder 13*b* are changed. In this example, the total of the added amount of first insulating powder 13*a* and the added amount of second insulating powder 13*b* was set to 3.0% by weight.

As shown in FIG. 12, in sample Nos. 16, 17, and 26 to 35, the added amount (wt %) of first insulating powder 13*a* is at least 0.2 times and at most 0.9 times the total of the added amount (wt %) of first insulating powder 13*a* and the added amount (wt %) of second insulating powder 13*b*. By setting the added amount of first insulating powder 13*a* to at least 0.2 times and at most 0.9 times the total added amount of insulating powder 13 as described above, it is possible to increase the value of "permeability×withstand voltage" compared with sample Nos. 3, 6, and 8. To further increase the value of "permeability×withstand voltage", as in the case of sample Nos. 16, 17, 28, 29, 33, and 34, the added amount of first insulating powder 13*a* may be set to at least 0.3 times and at most 0.5 times the total added amount of insulating powder 13.

(Summary)

Powder magnetic core 10 according to the present embodiment includes: metal magnetic substance powder 11; binding agent 12 that binds particles of metal magnetic substance powder 11; and insulating powder 13 provided in binding agent 12. Insulating powder 13 includes first insulating powder 13*a* and second insulating powder 13*b* each of which is in a needle shape or a plate shape. Median diameter D50 of second insulating powder 13*b* is smaller than median diameter D50 of first insulating powder 13*a*.

With such a configuration, it is possible to increase the withstand voltage of powder magnetic core 10 by first insulating powder 13*a* provided between particles of metal magnetic substance powder 11. Further, it is possible to maintain permeability of powder magnetic core 10 by second insulating powder 13*b* provided between particles of metal magnetic substance powder 11 and having small median diameter D50. Therefore, it is possible to provide powder magnetic core 10 with high performance.

Further, median diameter D50 of first insulating powder 13*a* may be greater than 0.11 times and less than 1.14 times median diameter D50 of metal magnetic substance powder 11.

By setting median diameter D50 of first insulating powder 13*a* to greater than 0.11 times and less than 1.14 times median diameter D50 of metal magnetic substance powder 11 as described above, it is possible to enhance withstand voltage while a reduction in permeability of powder magnetic core 10 is suppressed. Therefore, it is possible to provide powder magnetic core 10 with high performance.

Further, median diameter D50 of first insulating powder 13*a* may be at least 1.40 times and at most 11.67 times median diameter D50 of second insulating powder 13*b*.

With such a configuration, it is possible to increase the withstand voltage of powder magnetic core 10 by first insulating powder 13*a* provided between particles of metal magnetic substance powder 11 and having large median diameter D50. Further, it is possible to maintain permeability of powder magnetic core 10 by second insulating powder 13*b* provided between particles of metal magnetic substance powder 11 and having small median diameter D50. Therefore, it is possible to provide powder magnetic core 10 with high performance.

Further, a material of first insulating powder 13*a* and second insulating powder 13*b* may be talc.

Talc is a material having high insulating properties, thus enhancing the withstand voltage of powder magnetic core 10 and suppressing a reduction in permeability. Therefore, it is possible to provide powder magnetic core 10 with high performance.

Further, in elemental analysis of powder magnetic core 10 based on an image of a cross section of powder magnetic core 10, when: x denotes a detected amount of an element Mg at each of 20 measurement points at which the element Mg is detected between the particles of metal magnetic substance powder 11 in the image; y denotes a detected amount of the element Mg in an entirety of the image; and z denotes a detected amount of the metal magnetic substance powder in the entirety of the image, it may be that: five or more of the measurement points satisfy $x>(y/(100-z))\times 100$; and five or more of the measurement points satisfy $x<(y/(100-z))\times 100$.

Powder magnetic core 10 that satisfies such conditions can achieve powder magnetic core 10 in which insulating powder 13 is moderately dispersed. Therefore, it is possible to increase withstand voltage while maintaining permeability of powder magnetic core 10. Therefore, it is possible to provide powder magnetic core 10 with high performance.

Further, a method for producing a powder magnetic core according to the present embodiment includes: mixing metal magnetic substance powder 11 and insulating powder 13; after the mixing of metal magnetic substance powder 11 and insulating powder 13, adding a thermosetting resin to metal magnetic substance powder 11 and insulating powder 13 and mixing together; and pressure-molding a mixture generated in the adding. In the mixing of metal magnetic substance powder 11 and insulating powder 13, insulating powder 13 includes first insulating powder 13*a* and second insulating powder 13*b* each of which is in a needle shape or a plate shape, and a median diameter D50 of second insulating powder 13*b* is smaller than a median diameter D50 of first insulating powder 13*a*.

With such a configuration, it is possible to increase the withstand voltage of powder magnetic core 10 by providing first insulating powder 13*a* between particles of metal magnetic substance powder 11. Further, it is possible to maintain permeability of powder magnetic core 10 by providing second insulating powder 13*b*, having small median diameter D50, between particles of metal magnetic substance powder 11. Therefore, it is possible to provide powder magnetic core 10 with high performance.

The added amount of first insulating powder 13*a* may be at least 0.2 times and at most 0.9 times the total of the added amount of first insulating powder 13*a* and the added amount of second insulating powder 13*b*.

With such a configuration, it becomes possible to increase the withstand voltage of powder magnetic core 10 by first insulating powder 13*a*, and to adjust permeability of powder magnetic core 10 by second insulating powder 13*b*. Therefore, it is possible to provide powder magnetic core 10 with high performance.

Other Embodiments Etc.

Although a powder magnetic core and so on according to, for example, an embodiment of the present disclosure have been described above, the present disclosure is not limited to this embodiment.

Although the example in which whether the element Mg is segregated or dispersed is determined based on reference detected amount R, which is one value, is shown in the above-mentioned working examples, reference detected amount R is not limited to the above, and may have a predetermined range. For example, by setting ranges of ±2% for reference detected amount R calculated by Equation 1, reference detected amount R3 for sample No. 17 may be set to R3=5.5 to 9.5. In that case, in sample No. 17, of the 20 measurement points, detected amount x of the element Mg is greater than reference detected amount R3 at 9 measurement points, so it is determined that the element Mg is segregated. Further, of the 20 measurement points, detected amount x of the element Mg is smaller than reference detected amount R3 at 8 measurement points, so it is determined that the element Mg is dispersed. In this case, too, it is determined that insulating powder 13 is not excessively concentrated or excessively dispersed in powder magnetic core 10 for sample No. 17, and that insulating powder 13 is in a moderate dispersion state.

Although the example in which whether the element Mg is segregated and dispersed is determined based on the 20 measurement points in the BSE image is shown in the above-mentioned working examples, the number of measurement points is not limited to 20. For example, the number of measurement points may be N (N being an integer of 10 or more).

In that case, in elemental analysis of powder magnetic core 10 based on an image of a cross section of powder magnetic core 10, when: x denotes a detected amount of an element Mg at each of N measurement points at which the element Mg is detected between the particles of metal magnetic substance powder 11 in the image; y denotes a detected amount of the element Mg in an entirety of the image; and z denotes a detected amount of metal magnetic substance powder 11 in the entirety of the image, it may be determined that the insulating powder is moderately dispersed if: (N/4) or more of the measurement points satisfy $x>(y/(100-z))\times 100$; and (N/4) or more of the measurement points satisfy $x<(y/(100-z))\times 100$.

For example, an electrical component that uses the above-mentioned powder magnetic core is also included in the present disclosure. Examples of the electrical component include inductance components and the like, such as a high frequency reactor, an inductor, and a transformer. A power supply device including the above-described electrical component is also included in the present disclosure.

The present disclosure is not limited to this embodiment. Various modifications of the present embodiment that are conceivable by those skilled in the art, as well as embodiments resulting from combinations of constituent elements from different embodiments may be included within the scope of one or more aspects, as long as such modifications and embodiments do not depart from the essence of the present disclosure.

INDUSTRIAL APPLICABILITY

The powder magnetic core according to the present disclosure can be used as a material and the like for the magnetic core of a high frequency inductor or a transformer.

REFERENCE SIGNS LIST

- 10 powder magnetic core
- 11 metal magnetic substance powder
- 12 binding agent
- 13 insulating powder
- 13*a* first insulating powder
- 13*b* second insulating powder
- 20, 30 lead part
- 25 first terminal member
- 35 second terminal member
- 40 coil member
- 100 electrical component

The invention claimed is:

1. A powder magnetic core comprising:

a metal magnetic substance powder;

a binding agent that binds particles of the metal magnetic substance powder; and an insulating powder provided in the binding agent, wherein the insulating powder includes a first insulating powder and a second insulating powder each of which is in a needle shape or a plate shape, a median diameter D50 of the second insulating powder is smaller than a median diameter D50 of the first insulating powder, the median diameter D50 of the first insulating powder is greater than 0.11 times and less than 1.14 times a median diameter D50 of the metal magnetic substance powder, and the median diameter D50 of the first insulating powder is at least 1.40 times and at most 11.67 times the median diameter D50 of the second insulating powder.

2. The powder magnetic core according to claim 1, wherein a material of the first insulating powder and the second insulating powder is talc.

3. The powder magnetic core according to claim 2, wherein, in elemental analysis of the powder magnetic core based on an image of a cross section of the powder magnetic core, when:

x denotes a detected amount of an element Mg at each of 20 measurement points at which the element Mg is detected between the particles of the metal magnetic substance powder in the image;

y denotes a detected amount of the element Mg in an entirety of the image; and z denotes a detected amount of the metal magnetic substance powder in the entirety of the image, five or more of the measurement points satisfy $x>(y/(100-z))\times100$, and five or more of the measurement points satisfy $x<(y/(100-z))\times100$.

4. A method for producing a powder magnetic core, the method comprising:

mixing a metal magnetic substance powder and an insulating powder;

after the mixing of the metal magnetic substance powder and the insulating powder, adding a thermosetting resin to the metal magnetic substance powder and the insulating powder and mixing together; and pressure-molding a mixture generated in the adding, wherein in the mixing of the metal magnetic substance powder and the insulating powder, the insulating powder includes a first insulating powder and a second insulating powder each of which is in a needle shape or a plate shape, and a median diameter D50 of the second insulating powder is smaller than a median diameter D50 of the first insulating powder, and an added amount of the first insulating powder is at least 0.2 times and at most 0.9 times a total of the added amount of the first insulating powder and an added amount of the second insulating powder.

5. A powder magnetic core comprising:

a metal magnetic substance powder;

a binding agent that binds particles of the metal magnetic substance powder; and an insulating powder provided in the binding agent, wherein the insulating powder includes a first insulating powder and a second insulating powder each of which is in a needle shape or a plate shape, a median diameter D50 of the second insulating powder is smaller than a median diameter D50 of the first insulating powder, a material of the first insulating powder and the second insulating powder is talc, and in elemental analysis of the powder magnetic core based on an image of a cross section of the powder magnetic core, when:

x denotes a detected amount of an element Mg at each of 20 measurement points at which the element Mg is detected between the particles of the metal magnetic substance powder in the image;

y denotes a detected amount of the element Mg in an entirety of the image; and z denotes a detected amount of the metal magnetic substance powder in the entirety of the image, five or more of the measurement points satisfy $x>(y/(100-z))\times100$, and five or more of the measurement points satisfy $x<(y/(100-z))\times100$.

6. The powder magnetic core according to claim 5, wherein the median diameter D50 of the first insulating powder is greater than 0.11 times and less than 1.14 times a median diameter D50 of the metal magnetic substance powder.

7. The powder magnetic core according to claim 6, wherein the median diameter D50 of the first insulating powder is at least 1.40 times and at most 11.67 times the median diameter D50 of the second insulating powder.

* * * * *